Dec. 28, 1965   C. E. NEWKIRK   3,225,836
ADJUSTABLE IMPLEMENT HITCH MEANS
Filed June 8, 1964   3 Sheets-Sheet 1

INVENTOR.
CLARENCE E. NEWKIRK
BY George Douglas Jones
ATTORNEY

Dec. 28, 1965   C. E. NEWKIRK   3,225,836
ADJUSTABLE IMPLEMENT HITCH MEANS
Filed June 8, 1964   3 Sheets-Sheet 2

INVENTOR.
CLARENCE E. NEWKIRK
BY George Douglas Sines
ATTORNEY

Dec. 28, 1965   C. E. NEWKIRK   3,225,836
ADJUSTABLE IMPLEMENT HITCH MEANS
Filed June 8, 1964   3 Sheets-Sheet 3

INVENTOR.
CLARENCE E. NEWKIRK
BY George Douglas Jones
ATTORNEY

3,225,836
ADJUSTABLE IMPLEMENT HITCH MEANS
Clarence E. Newkirk, 227 N. Emily St., Anaheim, Calif.
Filed June 8, 1964, Ser. No. 373,165
4 Claims. (Cl. 172—319)

This is a continuation-in-part of application Ser. No. 158,743, filed December 12, 1961.

This invention is directed to a lifting, leveling, depth control and draft reducing mechanism, and is more especially directed to earth working members carried by an implement supporting frame, and operatively in combination with the well-known "three-point hitch" or "A-type hitch," the said hitch being in common use on a large number of tractors for the past decade and is still the prevailing type of hitch on the majority of wheel type tractors today. The said hitch throughout the following specification and claims will for convenience be referred to as the "A-type hitch."

Briefly, the A-type hitch includes a pair of fluid actuated, rearwardly extending arms operatively secured to each side of the lower portion of the rear transmission housing of a wheel type tractor, and a third connecting point on the rear upper portion of the the rear housing of a tractor of the wheel type and positioned centrally thereof, and hereinafter throughout the following specification and claims, will be referred to as the "stub" arm.

The present invention is directed to solve three major important problems inherent in the A-type hitch mechanism: namely, lack of implement lifting power; secondly, means for maintaining the implement carrying frame in parallel or predetermined vertical, longitudinal angular relation between the ground or soil surface and the said implement carrying frame, regardless of the vertical longitudinal angle of the tractor; and thirdly, and of major importance, in providing steering stability in relation to the ground surface in contact with the front steering wheels of the tractor; in short, to have the implement carrying frame maintain a predetermined set position, regardless of the soil conditions and the movement of the tractor in a vertical plane, while permitting lighter tractors or light powered tractors to perform work normally requiring large powered tractors, plus the vital problem of maintaining ground or soil contact of the front steering wheels of the tractor. These and other accomplishments are due to the modified, unique and extremely inexpensive linkage-leverage means, together with the rapid means of adjustment of said leverage forming a part of and working with the implement carrying frame.

Referring now in detail to the drawings by numerals of reference wherein like numerals refer to like parts.

Figure 1:
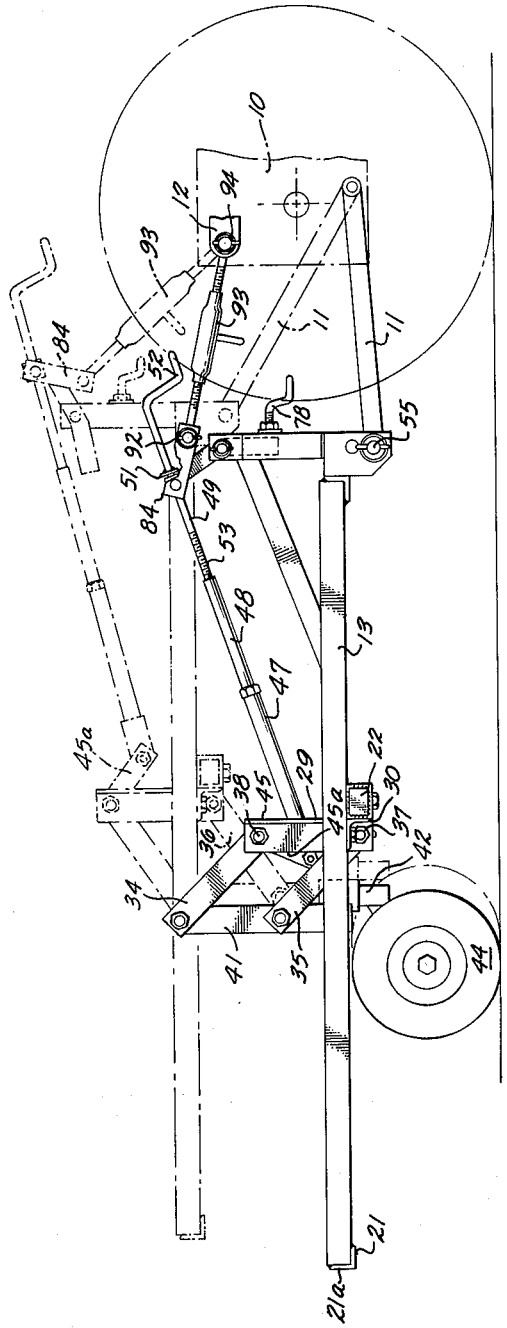
FIG. 1 is a side elevational view of the implement carrying frame of the present invention, illustrating the leverage and linkage means in combination with the A-type hitch linkage of the tractor and, in dash lines, of the implement carrying frame in raised position.
Figure 2:
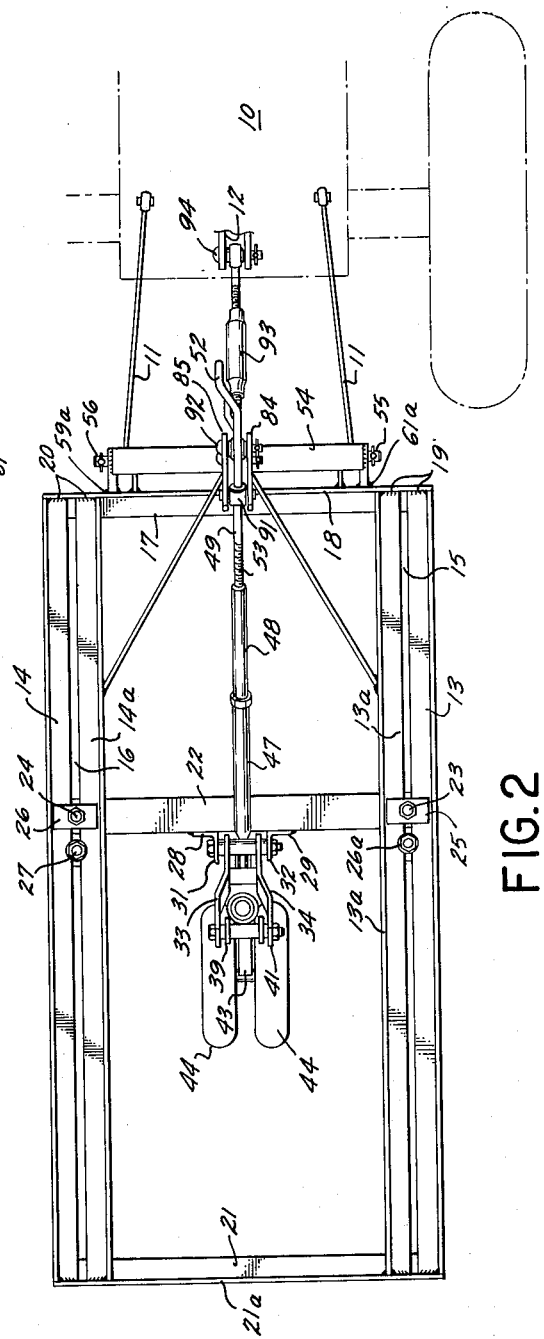
FIG. 2 is a top plan view of the present invention, illustrating the leverage-linkage means in relation to the tractor.

The mechanism of the instant invention including the adjustable leverage, linkage and operative means as best illustrated in FIG. 1 and FIG. 2 of the drawings, wherein the numeral 10 indicates the outline of a conventional rear portion of a wheel type tractor equipped with the A-type hitch contained and functioning from the internal portion of the housing 10, from which the fluid actuated, rearwardly extending arms 11 function. The stub arm 12 is secured to and forms a part of the upper central rear portion of the said transmission housing 10 of the tractor, and functions through valve means (not shown) with the said rearwardly extending, fluid actuated arms 11.

The principal structure of the instant invention includes implement carrying frames 13, 13a, 14 and 14a, which are preferably formed of angle members positioned in spaced apart relation, providing an open channel 15 and 16 therebetween. A transverse front member 17 preferably forms an angle member, the upright leg 18 portion thereof forming the forward wall to which is secured, preferably by weld means 19 and 20, the frame members 13, 13a, 14 and 14a.

A rear transverse member 21, formed of an angle member, is secured to the rear ends of the implement carrying frame members 13, 13a, 14 and 14a, preferably by conventional weld means to the upstanding leg 21a.

A central supporting transverse member 22, preferably formed as a box member, is secured to the said members 13, 13a, 14 and 14a, by bolts 23 and 24, which are mounted on plates 25 and 26, the said bolts 23 and 24 projecting through and between the channels 15 and 16, and through the box member 22. Adjacent to and in abutting relation is positioned an adjustable stop member 30, in FIG. 1 formed as an angle, one leg of which abuts the rear side of the box member 22, and the other leg of said angle is in abutting and secured relation to the under side of the frame members 13, 13a, 14 and 14a, providing adjustable stop means member 30 to prevent the box 22 from creeping rearwardly; the bolts 26a and 27 providing the securing means therefor.

It should be noted that this mounting means for supporting and adjusting the said member 22 provides adjusting means for a ground engaging supporting member which includes a pair of spaced apart upstanding members 28 and 29, formed preferably of angle members, said members being secured to and in rigid relation with the transverse member 22, and preferably positioned centrally and intermediate the frames 13, 13a and 14, 14a.

Openings forming apertures are positioned in alignment in the lower portion and upper portion of the rearwardly extending legs 31 and 32 of said upstanding members 28 and 29.

A conventional parallelogram is carried by said upstanding members 28 and 29 which includes a pair of spaced-apart upper members 33 and 34, and a pair of lower spaced apart members 35 and 36 by pivot means 37 and 38, and said members are pivotally secured to upstanding leg members 39 and 41 which form and to which are secured a spindle member 42, forming a part of the angular caster wheel supporting member 43, which carries the caster wheel 44. It should be noted that the only deviation from the conventional parallelogram in the instant invention is the form of the upper members which are formed as a bell crank acting as a lever. The elbow 45 or 45a of FIG. 1 is secured between members 33 and 34, and pivoted between upstanding members 31 and 32; the ends of said bell crank or lever arm are secured in pivotal relation to an adjusting screw threaded member 47 and 48 into which is positioned in screw threaded relation an adjusting arm 49, having a stop member 51, secured intermediate the ends thereof and provided with a crank or handle 52 positioned at the opposite end to the screw end 53.

Figure 3:
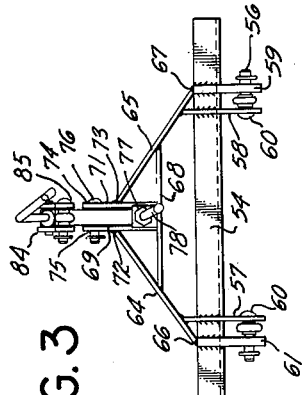
FIG. 3 is a front view of the A of the A-type hitch, and the pivoted operative members forming a part thereof.

The supporting structure forming the A of the A-type hitch comprises a transverse member 54, and provided with axle portions 55 and 56 positioned at each end thereof. The said transverse member 54 is secured to the front frame member leg 18 by means of plates 57 and 58, best illustrated in FIG. 3, secured thereto by conventional weld means, and plates 59 and 61 are secured by weld means 59a and 61a.

The pivot members 60 provide means for retaining the rearwardly extending arms 11 of the hitch in pivotal relation therewith.

The A portion of the A-type hitch includes legs 64 and 65 secured at their lower ends to the transverse member 54 by weld means 66 and 67. A transverse brace member 68 ties the upper portion of the A structure by conventional weld means. The apex of the A is left open and in spaced-apart relation to provide a pair of upstanding members 69 and 71, the lower ends of which are secured by weld means to brace member 68, and intermediate the upper ends of said members 69 and 71 having aligned circular openings forming apertures 74 and 75 therethrough, and provided with pivot means 76, and adjacent the lower portion of members 69 and 71 is secured a plate 77, provided with screw threaded circular openings therethrough forming an aperture into which is positioned in screw threaded relation an adjusting member 78, the function of which will become apparent as the description continues.

Figure 4:
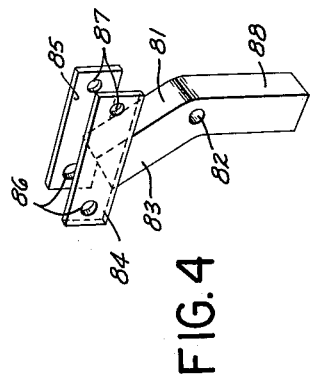
FIG. 4 is the operative leverage member and linkage connection means thereto.

Angled lever arm 81, best illustrated in FIG. 4 of the drawings, is provided with a circular opening therethrough forming an aperture 82, said aperture positioned at the elbow of the angled lever arm 81. The upper end 83 of said angled lever arm has secured thereto and in angular relation yoke members 84 and 85, said yoke having aligned circular openings therethrough forming apertures 86 and 87 in each end thereof. The lower portion 88 of said angled lever arm 81 forms an abutting portion thereof. The angled lever arm 81 is positioned in pivotal relation to the upstanding legs 69 and 71 by means of pivot 76. The yoke members 84 and 85 have the rear portions thereof provided and in pivotal relation with a swivelable block member 91, having a circular opening therethrough into which is positioned in slidable relation the adjusting arm 49.

The lower portion 88 of the angled lever arm 81 is now in abutting relation with the adjusting member 78.

The forward portion of the yoke 84 and 85 is secured by pivot member 92 to the third link or leg of the A-type hitch, and is provided with an adjusting portion 93. The end of said third link or leg is secured by pivot means 94 to the stub arm 12 on the tractor.

In the modification of the instant invention, as illustrated in FIG. 5, FIG. 6, FIG. 7 and FIG. 8, the parts and function of the same are similar in certain details to the instant invention as illustrated in FIG. 1, FIG. 2, FIG. 3 and FIG. 4 of the drawings and described supra.

The implement carrying frame of the modification of the instant invention is illustrated in a form wherein the frame per se forms a single longitudinal member having transverse members positioned at each end thereof, and in place of a rigid adjusting member for which flexible means are used.

The following detailed specification will clearly describe in detail the several parts, members, leverage and linkage means, in order to differentiate from the preceding specification wherein the rigid adjusting means forms a principal part of the mechanism of the instant invention.

Figure 5:
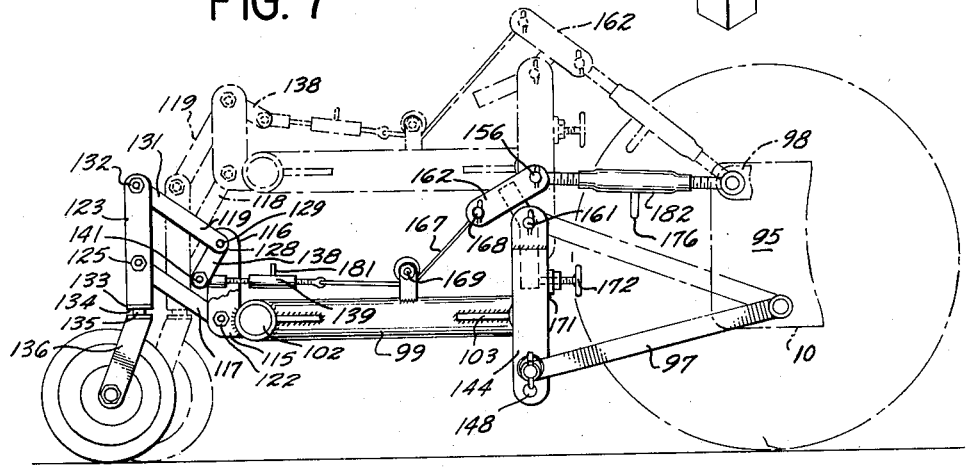
FIG. 5 is a side elevational view of the implement carrying frame in a modification of the same as illustrated in FIG. 1.

FIG. 5 is a side elevational view of the implement carrying frame forming a modification of the present invention, illustrating the leverage and the linkage means in combination with the A-type hitch linkage forming a part of a wheel type tractor, and, in dash lines, the implement carrying frame in raised position or elevated position; the remaining figures have been described supra.

Figure 6:
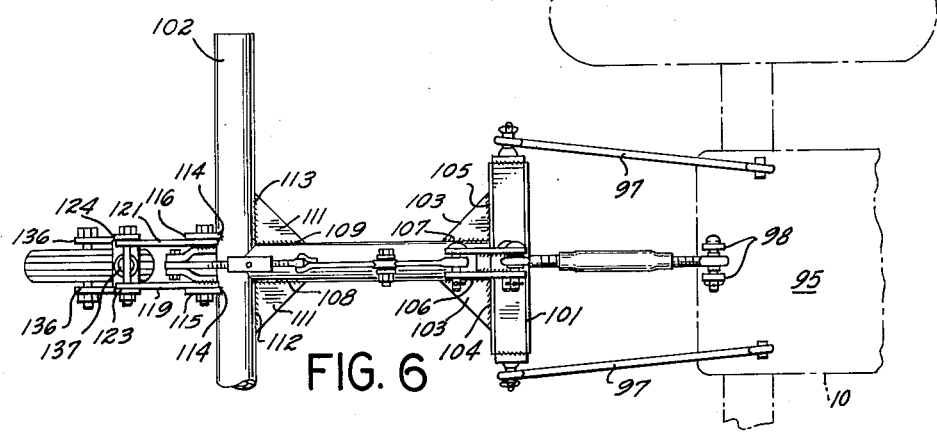
FIG. 6 is a top plan view of a modification of the present invention as illustrated in FIG. 2 of the drawings.
Figure 7:
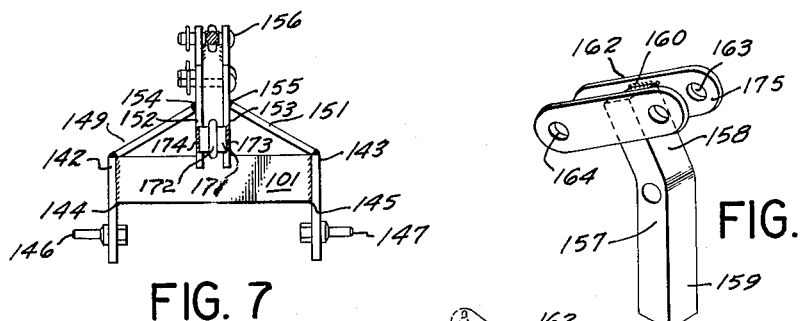
FIG. 7 is a front view of the A of the A-type hitch in a modified form of that illustrated in FIG. 3 of the drawings.
Figure 8:
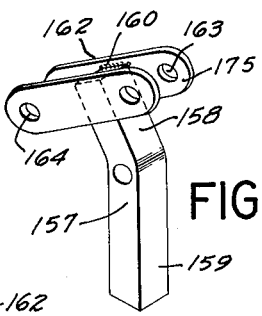
FIG. 8 is the operating leverage member and linkage in its modified form of that illustrated in FIG. 4 of the drawings.

The mechanism of the modification of the instant invention includes the adjustable leverage, linkage and operative means as best illustrated in FIG. 5 and FIG. 6 of the drawings, wherein the numeral 10 indicates the outline of a conventional rear portion of a wheel type tractor equipped with the A-type hitch, containing and functioning from the internal portion of the housing 96, from which the fluid actuated rearwardly extending arms 97, function.

The stub arm 98 is secured to and forms a part of the upper central rear portion of the transmission housing 95 of the tractor, and functions through valve means (not shown) with valve means operating the rearwardly extending arms 97.

The principal structure of the modification of the instant invention includes an implement carrying frame 99 provided with front transverse member 101 and a rear transverse member 102 secured to frame 99, and in spaced-apart relation. It should be here noted that other forms of frames may be used, wherein the transverse member or members may not be required to support the particular type of implement desired to be used under such conditions of varying soil types. In fact, the A member may be an upright unitary member rigidly secured to the frame of the implement and supporting the operative mechanism of the present invention and modification thereof, and not illustrated in the drawings, and this departure from the member or members as illustrated may be accomplished without departing from the scope of the appended claims, as the present invention is directed to the frame structure carrying member operated by and with the mechanism of the present invention.

The carrying frame 99 is preferably equipped with gusset plates 103 secured to the front transverse member 101 by any suitable means, such as welds 104 and 105, and to the frame 99 by welds 106 and 107.

The rear transverse member 102 is also secured to the frame member 99 by welds 108 and 109, securing gussets 111 thereto and to said transverse member 102 by welds 112 and 113.

Secured to the rear transverse member 102, preferably by conventional weld means, are upstanding spaced-apart members 115 and 116, the function of which forms the supporting means to carry a parallelogram structure similar in detail to the parallelogram illustrated in FIG. 1 of the drawings and described supra. The parallelogram structure includes lower link members 117 and 118 and upper bell crank lever arms 119 and 121, the lower link members 117 and 118 being secured to one end by pivot means 122 positioned in the lower portion of the members 115 and 116. The opposite ends of the links 117 and 118 are secured to a pair of upstanding members 123 and 124 by pivot means 125 which is positioned in the lower portions of said members 123 and 124. The members 115 and 116 are secured to the rear transverse member 102 by weld means 114.

The bell crank lever arms 119 and 121 are pivoted at the elbow 128 to the upper portion of the upright members 115 and 116 by conventional pivot means 129. The elongated arm portion 131 of the upper arms 119 and 121 are pivoted to the upper portion 132 of the upstanding members 123 and 124. The upstanding members 123 and 124 are secured by weld means and in rigid spaced-apart relation to a transverse member 133, having a centrally positioned circular opening therethrough forming an aperture 134 into which is placed a spindle 135, and having a removable bearing member 137 therefor forming a portion of a caster with wheel legs 136.

The lever arm legs 138 are secured, preferably by weld means, between the upper lever arms 119 and 121, which form a bell crank and is secured by pivot means between upright bars 115 and 116 at pivot 129, to which is secured in pivotal relation the adjusting member 139 by pivot means 141.

Secured to the front transverse member 101 and preferably at each end thereof is the A structure of the A-type hitch, including legs 142 and 143 secured at each end of the transverse member 101 by weld means 144 and 145, the depending legs terminating below the transverse member 101 and provided with, and adjacent the lower ends thereof, axles 146 and 147 to which are secured in pivotal relation the rearwardly extending arms 97, and additional circular openings therethrough forming apertures 148 may be provided in the legs 142 and 143 into which axles 146 and 147 may be placed in the event that higher or lower tractors are used in order to compensate for the elevation of the tractor hitch.

The upper portion of the A structure includes the legs 149 and 151 positioned in an inwardly direction and in angular relation to the transverse member 101, and the apex of which terminates in spaced-apart relation and secured to a pair of spaced-apart upstanding members 152 and 153 by weld means 154 and 155. The lower ends of the upstanding members 152 and 153 are secured to the transverse member 101 by conventional weld means. The upper end portions of the upstanding members 152 and 153 are provided with circular openings therethrough forming apertures to support pivot means 156, which carries lever arm 157, legs 158 and 159; said lever arm 157, the legs 158 and 159 being positioned in angular relation to each other, the central portion of arm 157 having a circular opening therethrough into which is positioned pivot member 161 for supporting the lever arm 157.

The end portion of leg 158 is rigidly secured to a yoke member 162 and provided with circular openings forming apertures 163 and 164 therethrough and positioned at each end of the yoke 162, said yoke being secured approximately intermediate the ends thereof to the lever arm 158 by conventional weld means 160. It should be here noted that the yoke 162 may be formed as an integral part of the lever arm 158 without departing from the scope of the appended claims.

A plate 171 is secured by weld means 173 and 174 to the upstanding members 152 and 153, and positioned towards the lower portion thereof.

The central portion of the plate 171 is provided with a screw threaded circular opening therethrough forming an aperture into which is positioned in screw threaded relation an adjusting member 172, said member 172 projecting through and in abutting relation with the leg 159 of the lever arm 157.

Adjustable flexible member 167, having one end secured to the rear end of the yoke 162 by pivot means 168, is carried by sheave or pulley 169, secured in rotatable relation to the frame member 99, and the opposite end of the flexible member 167 is secured to the front end of the adjusting member 139, the said member 139 preferably having mounted thereon a handle portion 181 for convenience of adjusting the same.

The screw threaded member 182 forms the third leg of the A-type hitch, being attached to and in pivotal relation with the front end of the yoke 175 by pivot member 156, and the opposite end of the adjusting member 182 is pivotally attached to the stub arm 98 of the tractor. The adjusting member 182 is provided with a handle 176 for convenience of adjustments.

The operation and functioning of the above-referred-to parts, as they are directly or indirectly related to and form a part of the instant invention and modification thereof, will now be described in detail.

In describing the instant invention, together with the several adjustments and settings, it should be assumed that the implement frame 13, FIG. 1, and frame 99, FIG. 5, is supporting earth working tools; for example, a disc harrow, or a field cultivator or the like.

The first operation is to attach the inplement carrying frame to the tractor in the same manner as a standard A-type hitch is attached to an implement.

For convenience in describing the adjustments and operation of the instant invention, the reference numerals used will refer to those used in FIG. 1 and FIG. 2 of the drawings.

Attach the rearwardly extending arms 11, which are functionally operated by the hydraulic mechanism of the tractor, to the axles 55 and 56, FIG. 2 of the drawings. The next operation is to adjust the length of the third link of the A-type hitch, including the adjustable screw threaded member 93, FIG. 1, which is connected to the stub arm 12 on the tractor by pivot means member 94, to fit between the leverage-lifting linkage at pivot 92, FIG. 2. By means of the hydraulic system of the tractor the implement carrying frame 13 should now be lifted.

The frame 13, FIG. 1, is designed to have mounted and secured thereunder agricultural or industrial earth working tools. In the event disc harrows are to be used, such as offset discs, place one disc gang in front of caster wheel transverse member 22, and under the frame 13, and at any desired angle or degree pitch, thus throwing the soil to the right, and one disc gang to the rear of the caster wheel transverse member 22 and under the frame 13, and at the desired angle or degree pitch, thus throwing the soil to the left.

The lifting leverage assembly in FIG. 4, which is positioned on the upper portion of the A portion of the hitch and connected to the top link 93, and to the parallelogram members of the caster wheel, will lift the disc level through the use of the tractor hydraulic system forming the operating means of the A-type hitch. This position is maintained whether more weight is added to the front or to the rear on frame 13, and it should be noted that forty-six percent (46%) of the tool weight is made possible by means of the instant invention; the resultant advantage is that this weight is transferred to the tractor, thereby making it possible for light tractors to lift and handle heavier loads, such as larger discs and the like.

When the tool carrying frame 13 is lifted for road transport, the lower portion 88 of lever arm 81, FIG. 4, is raised away from crank member 78, thus making the hitch flexible at pivot 76, thereby enabling the parallelogram members 34 and 35 to raise or lower automatically and making it possible for the tractor to be driven over uneven ground surfaces, embankments or ditches without affecting the steering qualities of the tractor.

In setting the implement for field operation, loosen crank member 78, then lower rearwardly extending draft arms 11, with the tractor hydraulic system, until the implement is in the ground to the desired depth. Then adjust crank member 78 against lower portion 88 of lever arm 81, FIG. 4, which places pressure on the third link 93 in abutting relation to the stub arm 12 of the tractor, thus holding the working soil tool in the ground and transferring the weight to the tractor, thus providing additional traction.

In extremely sandy soil where the soil working tool has to be held up by means of the hydraulic system of the tractor, it should be noted that with the conventional or standard three-point or A-type hitch when operating in this soil condition, there is a pull back and away from the stub arm 12 on the tractor, thereby loosing traction and depth control of the hydraulic system of the tractor. By adjusting crank member 78, FIG. 3, tight against the lower portion 88 of the lever arm 81, FIG. 4, pressure is then maintained against and in abutting relation with the stub arm 12 on the tractor, thus providing traction and maintaining depth of cut in sandy soil.

When the tractor is working over uneven ground, the forward pressure against the stub arm 12 of the tractor is maintained, and the parallelogram members 34 and 35, in conjunction with the rerwardly extending arms 11 of the tractor, will move in unison automatically through the means of the hydraulic system on the tractor. Under such adjustments the implement carrying frame 13 will remain in a horizontal position in relation to the ground surface at all times.

It will be observed from the foregoing description of the several adjusting members, the simplicity of adjustments to provide the numerous angles that may be had of the implement carrying frame and the earth working tools carried thereby, as well as providing the adjustments for maintaining the implement carrying frame 13 in longitudinal level or angular relation to the soil surface, as well as the important adjustment to apply pressure on the front portion of the tractor, thus providing complete control of the dirigible mechanism of the tractor.

My invention has been built, tested and found to accomplish all of the foregoing mentioned objectives and advantages, and is now being built and sold in large quantities.

Therefore, I intend to be limited solely by the scope of the appended claims.

What I claim is:

1. In an implement carrying frame, supporting at its front end the conventional A-type hitch structure for attaching to and forming a part of a tractor having stub arm and dirigible front members, the rear portion of said frame having secured thereto a parallelogram pivotally connected with a rolling ground engaging member, the top link of said parallelogram means being formed with an angular depending lever arm portion, leverage and linkage members including an angular lever arm pivoted to the top portion of the upstanding A section of said A-type hitch, a yoke member rigidly secured to the upper end of said lever arm, and the lower end of said lever arm in adjustable abutting relation with an adjustable stop means secured to the lower portion of said A-type section of said hitch, the rear portion of said yoke member pivotally supporting a swiveable block member and having a circular opening forming an aperture therethrough, an adjustable crank member positioned through said aperture and provided with a stop member intermediate the ends thereof and forward of said block member, the opposite end of said adjusting crank being secured in pivotal relation to the depending lever arm of said parallelogram, and the forward end of said yoke having the third leg of the A-type hitch formed as an adjustable threaded telescoping member thereto, and the opposite end of the said third leg of the A-type hitch being pivoted to a stub arm of the tractor, the combination of adjusting means providing the adjustable leverage and linkage means to maintain the implement carrying frame in the desired predetermined angular relation with the ground surface while maintaining ground contact of the tractor's dirigible members.

2. In an earth working implement supporting frame for connection to a dirigible tractor, including, a rigid upstanding structure comprising the A of the conventional A-type hitch, axle members forming a part of the legs of said A to which are pivotally attached the rearwardly extending draft arms of said tractor, and the third leg of said hitch forming an adjustable member connected to the stub arm of the tractor, the members of said upstanding structure secured in spaced apart relation, the upper portion of which is secured in pivotal relation to an angular lever arm, the upper end of which having rigidly secured thereto a yoke member provided with circular openings therethrough forming apertures at each end thereof, the front end being pivotally attached to the opposite end of said adjustable third leg hitch member, the lower portion of the spaced apart upstanding structure having a plate member secured to each of the said members and provided with a screw threaded adjusting means, the rear of said implement supporting frame being provided with a conventional parallelogram structure having supporting means to which is positioned in pivotal relation a conventional caster rolling ground engaging member; the top links of the parallelogram being formed in the shape of a bell crank, providing lever means, an adjusting member, one end of which is pivotally secured to said bell crank lever arm of said parallelogram and intermediate the ends of which adjusting member is secured a stop member, said adjusting member being free to slide within a pivoted block member, and said member being pivoted to the rear end of the yoke, the lower end of the angular lever arm being in adjustable abutting relation with said screw threaded adjusting means, the lever arm and linkage including and comprising means to position and hold said earth working implement supporting frame in predetermined parallel or angular relation to the ground surface, while maintaining ground contact of the dirigible portion of the tractor.

3. An earth working implement carrying frame oprated in conjunction with an A-type hitch on a wheel type tractor having front steering wheels, said frame having the forward end thereof secured in rigid relation thereto with rigid upstanding members, the upper exposed end portion thereof having pivotally affixed thereto an angular member, the upper portion thereof having rigidly secured thereto spaced apart members forming a yoke member provided with pivot retaining openings therethrough forming apertures positioned at each end thereof, the lower portion of the spaced apart members forming a yoke having a plate member secured thereto and provided with a screw threaded portion positioned centrally thereof and an adjustable screw threaded member in screw threaded relation with said portion, the lower part of said angular member being in abutting relation with the screw threaded member, a parallelogram structure secured to the rear of said implement carrying frame, the upper arms thereof formed as a bell crank, and a pair of lower arms completing the parallelogram structure, said arms secured to an upright member to which is secured a caster type ground engaging member, the bell crank upper arms attached in pivotal relation to an adjusting member slideable within a pivoted block carried by the rear openings of said yoke member, the front end of the yoke member being pivotally attached to an adjustable means secured to the tractor by pivot means, and a pair of rearwardly extending arms pivotally secured to the front portion of said implement carrying frame, said adjustable means attached to the tractor and said rearwardly extending arms forming the attaching means of an A-type hitch, whereby under excessive draft, pressure is applied through an adjustable engaging member to the mechanism of the A-type hitch, thereby maintaining contact of the front wheels of the tractor with the ground surface.

4. In an implement carrying frame, supporting at its front end the conventional A-type hitch structure for attaching to and forming a part of a tractor having stub arm and dirigible front members, the rear portion of said frame having secured thereto a parallelogram means pivotally connected with a rolling ground engaging member, the top link of said parallelogram means being formed with an angular depending lever arm portion, leverage, and linkage members including an angular lever arm pivoted to the top portion of the upstanding A section of said A-type hitch, a yoke member rigidly secured to the upper end of said lever arm, and the lower end of said lever arm in adjustable abutting relation with stop means on the lower portion of said A-type section of said hitch, the rear portion of said yoke pivotally supporting a swiveable block member and having a circular opening forming an aperture therethrough, an adjustable crank member positioned through said aperture and provided with a stop member intermediate the ends thereof and forward of said block member, the opposite end of said adjusting crank being secured in pivotal relation to the depending lever arm of said parallelogram, and the forward end of said yoke having the third leg of the A-type hitch formed as an adjustable threaded telescoping member thereto, and the opposite end of the said third leg of the A-type hitch being pivoted to a stub arm of the tractor, the combination of adjusting means providing the adjustable leverage and linkage means to maintain the implement carrying frame in the desired predetermined angular relation with the ground surface while maintaining ground contact of the tractor dirigible members.

References Cited by the Examiner
UNITED STATES PATENTS

| | | | |
|---|---|---|---|
| 2,098,472 | 11/1937 | Strandlund | 172—319 |
| 2,118,180 | 5/1938 | Ferguson | 172—11 |
| 2,649,721 | 8/1953 | Spedding | 172—448 |
| 2,673,505 | 3/1954 | Altgelt | 172—319 |
| 2,704,496 | 3/1955 | Taylor | 172—239 |

FOREIGN PATENTS

| | | |
|---|---|---|
| 207,602 | 2/1960 | Austria. |
| 1,075,572 | 4/1954 | France. |
| 1,226,805 | 2/1960 | France. |
| 1,070,432 | 12/1959 | Germany. |
| 548,669 | 9/1956 | Italy. |

OTHER REFERENCES

Rabewerk H. Clausing, German application 1,088,748, printed Sept. 8, 1960.

ABRAHAM G. STONE, *Primary Examiner.*

T. GRAHAM CRAVER, *Examiner.*

L. J. BLACKMAR, F. B. HENRY, *Assistant Examiners.*